(12) United States Patent
Hara et al.

(10) Patent No.: US 7,947,362 B2
(45) Date of Patent: *May 24, 2011

(54) CARBON FIBER COMPOSITE SHEET

(75) Inventors: Hiroshi Hara, Iwakuni (JP); Masumi Hirata, Iwakuni (JP); Hiroki Sano, Iwakuni (JP); Shoichi Takagi, Iwakuni (JP)

(73) Assignee: Teijin Limited, Osaka (JP)

( * ) Notice: Subject to any disclaimer, the term of this patent is extended or adjusted under 35 U.S.C. 154(b) by 162 days.

This patent is subject to a terminal disclaimer.

(21) Appl. No.: 12/298,745

(22) PCT Filed: Apr. 26, 2007

(86) PCT No.: PCT/JP2007/059426
§ 371 (c)(1),
(2), (4) Date: Oct. 27, 2008

(87) PCT Pub. No.: WO2007/126133
PCT Pub. Date: Nov. 8, 2007

(65) Prior Publication Data
US 2009/0233092 A1  Sep. 17, 2009

(30) Foreign Application Priority Data

Apr. 27, 2006 (JP) .................. 2006-123379
Jul. 21, 2006 (JP) .................. 2006-199482
Sep. 13, 2006 (JP) .................. 2006-247998
Sep. 28, 2006 (JP) .................. 2006-264197

(51) Int. Cl.
*A01K 1/015* (2006.01)
(52) U.S. Cl. .................. 428/221; 428/293.4; 428/297.4; 428/367

(58) Field of Classification Search .................. 428/221, 428/220, 367, 408, 293.4, 297, 4; 423/447.2
See application file for complete search history.

(56) References Cited

U.S. PATENT DOCUMENTS

| | | | | |
|---|---|---|---|---|
| 5,721,308 A | * | 2/1998 | Yamamoto et al. | 524/495 |
| 7,651,767 B2 | * | 1/2010 | Hirata et al. | 428/367 |
| 7,767,302 B2 | * | 8/2010 | Hirata et al. | 428/408 |
| 2003/0194544 A1 | | 10/2003 | Tobita et al. | |
| 2009/0061193 A1 | * | 3/2009 | Hara et al. | 428/220 |
| 2009/0075054 A1 | * | 3/2009 | Hirata et al. | 428/307.7 |
| 2009/0233092 A1 | * | 9/2009 | Hara et al. | 428/339 |
| 2010/0068496 A1 | * | 3/2010 | Hirata et al. | 428/293.4 |

FOREIGN PATENT DOCUMENTS

| | | |
|---|---|---|
| EP | 1 873 283 A1 | 2/2008 |
| JP | HEI2-242919 A | 9/1990 |
| JP | 5-17593 A | 1/1993 |
| JP | HEI5-017593 A | 1/1993 |
| JP | 2000-195998 A | 7/2000 |
| JP | 2002-285457 A | 10/2002 |
| JP | 2003-301048 A | 10/2003 |
| JP | 20061125516 * | 10/2006 |
| WO | 2006/112487 A1 | 10/2006 |
| WO | 2006-112516 A1 | 10/2006 |

* cited by examiner

*Primary Examiner* — N. Edwards
(74) *Attorney, Agent, or Firm* — Sughrue Mion, PLLC

(57) ABSTRACT

A carbon fiber composite sheet obtained by combining a carbon fiber aggregate with a thermosetting resin component selected from the group consisting of thermosetting silicone-based gel components, thermosetting epoxy resin components and thermosetting silicone resin components, and then curing the thermosetting resin component, the carbon fiber composite sheet having crystallite sizes of at least 5 nm in the direction of growth of the hexagonal mesh surface of the carbon fibers composing the carbon fiber aggregate, and the carbon fiber composite sheet having a thermal conductivity of at least 2 W/(m·K).

26 Claims, No Drawings

CARBON FIBER COMPOSITE SHEET

TECHNICAL FIELD

The present invention relates to a carbon fiber composite sheet obtained by combining pitch-based carbon fibers and a thermosetting resin component.

BACKGROUND ART

High-performance carbon fibers are classified as either PAN-based carbon fibers obtained using polyacrylonitrile (PAN) as the starting material, or pitch-based carbon fibers obtained using a series of pitches as starting material.

Carbon fibers are widely used for space and aviation, construction and civil engineering, and sports and leisure purposes, taking advantage of their extremely high strength and elastic modulus compared to ordinary synthetic polymers.

With recent increasing interest in methods for more efficient use of energy to achieve energy savings, Joule heat generation by accelerated CPUs and electronic circuits is becoming a significant issue. Overcoming such problems requires "thermal management", to handle the heat in an efficient manner.

Carbon fibers have high thermal conductivity compared to ordinary synthetic polymers, and still further increase in heat conduction is being investigated. However, the thermal conductivity of most currently marketed PAN-based carbon fibers is lower than 200 W/(m·K), and they are not necessarily satisfactory from the viewpoint of thermal management. Pitch-based carbon fibers, on the other hand, have a high degree of graphitization and are therefore recognized as being more capable of achieving high thermal conductivity than PAN-based carbon fibers.

Commonly known heat-conductive fillers include those filled with metal oxides, metal nitrides, metal carbides and metal hydroxides such as aluminum oxide, boron nitride, aluminum nitride, magnesium oxide, zinc oxide, silicon carbide, quartz, aluminum hydroxide and the like. However, metal material-based fillers have high specific gravity, and their weights are therefore increased when used to form composite materials. Also, addition of spherical materials such as carbon black as a carbon-based material in large amounts causes "powder falling", while the conductivity adversely affects devices, particularly electronic devices. Carbon fibers, on the other hand, have low specific gravity and therefore offer the advantage not only of lowering the weight of the composite material when added to the same volume as a metal material-based filler, but also of preventing powder falling due to their fibrous form.

Incidentally, such composite materials are sometimes used to connect heating units and heat sinks. When a highly rigid resin composition is used in such cases, gaps are often created between the heating unit and heat sink, making it impossible to achieve efficient heat conduction. Composite materials with greater flexibility and greater ability to follow the shapes of heating units and heat sinks have therefore been desired.

The features of composite materials used for thermal management will now be described. For efficient utilization of the high thermal conductivity of carbon fibers, it is preferred for the carbon fibers to form a network within some sort of matrix. Especially when the network is formed in a three-dimensional manner, the high heat conduction of the carbon fibers is exhibited not only in the in-plane direction of the molded article but also in its thickness direction, which is considered to be highly effective for radiator plate uses, for example. However, while fibers used in the past as woven fabrics to form composite materials in combination with matrices have improved thermal conductivity within the plane, they exhibit less than satisfactory heat conduction in the thickness direction due to the inability to adequately form a carbon fiber network.

In view of this situation, many attempts have been made to more radically improve the thermal conductivity of carbon fibers. For example, Patent document 1 discloses a thermal conductive molded article with high mechanical strength obtained by impregnating carbon fibers which are aligned in a single direction, with graphite powder and a thermosetting resin. Also, Patent document 2 discloses improvement in the physical properties such as thermal conductivity by enhancing the physical properties of the carbon fibers, but it is unclear whether definite improvement is achieved in the thermal properties of molded articles.

[Patent document 1] Japanese Unexamined Patent Publication HEI No. 5-17593
[Patent document 2] Japanese Unexamined Patent Publication HEI No. 2-242919

DISCLOSURE OF THE INVENTION

It is an object of the present invention to solve a problem whose solution has been elusive in the prior art, by providing a carbon fiber composite sheet that exhibits suitable thermal conductivity.

According to the invention, this object can be achieved by a carbon fiber composite sheet obtained by combining a carbon fiber aggregate with a thermosetting resin component selected from the group consisting of thermosetting silicone-based gel components, thermosetting epoxy resin components and thermosetting silicone resin components, and then curing the thermosetting resin component, the carbon fiber composite sheet having crystallite sizes of at least 30 nm in the direction of growth of the hexagonal mesh surface of the carbon fibers composing the carbon fiber aggregate, and the carbon fiber composite sheet having a thermal conductivity of at least 2 W/(m·K).

BEST MODE FOR CARRYING OUT THE INVENTION

The invention will now be explained in greater detail.

As examples of starting materials for the carbon aggregate used for the invention there may be mentioned fused heterocyclic compounds including fused polycyclic hydrocarbon compounds such as naphthalene or phenanthrene, and fused heterocyclic compounds such as petroleum pitch or coal pitch. Preferred among these are fused polycyclic hydrocarbon compounds such as naphthalene and phenanthrene, with optical anisotropic pitch and especially mesophase pitch being especially preferred. Any one of these may be used alone or two or more may be used in appropriate combinations, but using mesophase pitch alone is particularly preferred for achieving improved thermal conductivity of the carbon fibers.

The softening point of the starting pitch may be determined by the Mettler method, and it is preferably between 250° C. and 350° C. If the softening point is below 250° C., fusing between fibers and significant heat shrinkage will occur during infusibility treatment. If it is higher than 350° C., thermal decomposition of the pitch will occur making it difficult to form filaments.

The starting pitch may be spun by a melt blowing process and then subjected to infusibility treatment and firing to form a carbon fiber aggregate. Each of the steps will now be explained.

According to the invention, there are no particular restrictions on the shape of the spinning nozzle for the pitch fibers used as the starting material for the carbon fibers, but preferably the ratio between the nozzle hole length and diameter is less than 3, and even more preferably less than 1.5. There are also no particular restrictions on the temperature of the nozzle during spinning, and it may be any temperature at which a stable spinning state can be maintained, or in other words, any temperature at which the spinning pitch viscosity is 2-80 Pa·S and preferably 30-60 Pa·S.

The pitch fibers discharged through the nozzle hole are converted to staple fibers by blowing gas, heated to 100-350° C., at a linear speed of 100-10,000 m/min near the thinning point. The blowing gas may be air, nitrogen or argon, but air is preferably used from the viewpoint of cost performance.

The staple pitch fibers are collected on a wire mesh belt and formed into a continuous mat, and then cross lapped to obtain a carbon fiber aggregate.

The carbon fiber aggregate preferably comprises the carbon fibers in the form of a mat by three-dimensional intermingling inside the carbon fiber aggregate, as such a fiber aggregate will exhibit more satisfactory three-dimensional thermal conductivity for the obtained carbon fiber composite sheet.

Such intermingling can be achieved using a "vapor tube" set at a location between the spinning nozzle and the wire mesh belt.

The aggregate composed of pitch fibers obtained in this manner is subjected to infusibility treatment and fired at 1500-3500° C., by known methods. The infusibility treatment can be carried out at 200-350° C. using air or a gas comprising air and added ozone, nitrogen dioxide, nitrogen, oxygen, iodine or bromine, but it is preferably carried out in air from the standpoint of safety and convenience. The infusible pitch fibers are then fired in a vacuum or in an inert gas such as nitrogen, argon or krypton, but the firing is preferably carried out at ordinary pressure in low-cost nitrogen. In order to increase the thermal conductivity of the carbon fibers, the firing temperature is preferably 2300-3500° C. A more preferred range is 2500-3500° C. During the firing, they are preferably placed in a graphite crucible and shielded from external physical and chemical effects. The graphite crucible is not restricted in its size or shape so long as it can hold the desired amount of the infusibilized mat composed of the aforementioned starting material, but in order to prevent damage to the carbon fibers by reaction with oxidizing gases or carbon vapor in the furnace during firing or cooling, it is preferably a highly-airtight, covered crucible.

The carbon fibers composing the carbon fiber aggregate used for the invention must have crystallite sizes of at least 30 nm in the direction of growth of the hexagonal mesh surface. The crystallite sizes in the direction of growth of the hexagonal mesh surface can be determined by a known method, such as based on the diffraction profile from the (110) plane of the carbon crystals, obtained by X-ray diffraction. The crystallite size is important because heat conduction is supported primarily by phonons, and it is the crystals that generate phonons.

The carbon fiber aggregate is composed of carbon fibers obtained from a mesophase pitch starting material, and preferably the mean fiber diameter of the carbon fibers is 5-20 μm and the mean fiber length is 0.01-1000 mm.

A mean fiber diameter within this range will result in satisfactory productivity without causing fusion during the infusibility treatment step. The mean fiber diameters are more preferably 3-15 μm and even more preferably 5-12 μm.

If the mean fiber length is within the range specified above, intermingling between the fibers will take place to a suitable degree, resulting in satisfactory handleability of the fiber aggregate. The mean fiber length is more preferably 0.1-500 mm and even more preferably 3-300 mm.

The CV value determined by the following formula is preferably no greater than 20%, as the percentage of the fiber diameter variance with respect to the mean fiber diameter. It is more preferably no greater than 17%. The CV value preferably does not exceed 20% from the viewpoint of productivity, since this will increase fibers with sizes of 20 μm and greater which can cause trouble during infusibility treatment.

$$CV = \frac{S_1}{\overline{D_1}} \quad (1)$$

Here, $S_1$ is the degree of fiber diameter dispersion, and $D_1$ is the mean fiber diameter.

$S_1$ is determined by the following formula (2).

$$S_1 = \sqrt{\frac{\sum_i (D - \overline{D_1})^2}{n^2}} \quad (2)$$

Here, D is the fiber diameter of each of n fibers, and $D_1$ is the mean value of n fiber diameters, where n is the number of fibers.

According to the invention, the thermal conductivity of the carbon fiber composite sheet may be measured by a known method, among which the probe method, hot disk method and laser flash method are preferred, and the probe method is preferred in terms of ease.

The thermal conductivity of the carbon fibers themselves will usually be about a few hundred W/(m·K), but when mixed with a resin to form a molded article, the thermal conductivity is drastically reduced by defects, inclusion of air and formation of unexpected gaps. It has therefore been difficult in practice to achieve a thermal conductivity of greater than 1 W/(m·K) with carbon fiber composite sheets. According to the invention, however, this is solved by using a carbon fiber aggregate composed of carbon fibers with crystallite sizes of 5 nm and greater, so that thermal conductivity of more than 2 W/(m·K) can be achieved for carbon fiber composite sheets. The thermal conductivity is preferably at least 3 W/(m·K), more preferably at least 5 W/(m·K), even more preferably at least 7 W/(m·K) and most preferably at least 10 W/(m·K). The ultimate limit that can be expected is about 600 W/(m·K) as the thermal conductivity of carbon fibers alone.

The proportion of the carbon fiber aggregate in the carbon fiber composite sheet according to the invention is preferably in the range of 15-50% as the volume fraction (25-70% as weight percentage). Within this range it is possible to obtain high levels for both the thermal conductivity and mechanical properties of the obtained carbon fiber composite sheet.

According to the invention, the thermosetting resin component that is cured after being combined with the carbon fiber aggregate may be a thermosetting silicone-based gel component, thermosetting epoxy resin component or thermosetting silicone resin component, which may be selected as desired depending on the final intended use of the obtained carbon fiber composite sheet.

For example, a thermosetting silicone-based gel component may be used when a pressure-sensitive adhesive property is to be imparted to the carbon fiber composite sheet, a thermosetting epoxy resin component may be used when it is desired to prevent generation of volatilizing components from the carbon fiber composite sheet during heating, or a thermosetting silicone resin component may be used when flexibility is to be imparted to the carbon fiber composite sheet, but there is no limitation to these modes and any may be selected as appropriate for the purpose.

A thermosetting silicone-based gel component preferably has a viscosity of 0.01-2000 Pa·s at least in a range of 0-30° C., and preferably it is one that cures at 70-200° C. and completes curing in about 1-120 minutes.

Thermosetting silicone-based gel components include addition reaction and condensation reaction types, but addition reaction types are preferred to minimize participation by third components. As such thermosetting silicone-based gel components there may be used, specifically, the SE series of thermosetting silicone-based gel components by Dow Corning Toray Co., Ltd., such as SE1886 and SE1885. These have low viscosity and satisfactory workability.

There are no particular restrictions on thermosetting epoxy resin components, but they are preferably liquid with a viscosity of 0.01-200 Pas at least in the range of 0-30° C. As such thermosetting epoxy resin components there may be used, specifically, thermosetting epoxy resin components by Japan Epoxy Resins Co., Ltd., such as jER 827 and jER 871 (formerly EPIKOTE 827 and EPIKOTE 871). These also have low viscosity and satisfactory workability. The thermosetting epoxy resin component is cured using a curing agent. The curing agent is not particularly restricted, and modified aliphatic amines, modified aromatic amines, modified alicyclic amines, 3-methyl1, 2, 3,6-tetrahydrophthalic anhydride, 4-methyl-1,2,3,6tetrahydrophthalic anhydride, methyl-3, 6endomethylene1,2,3,6-tetrahydrophthalic anhydride and the like may be used. As specific marketed products there may be used jER CURE FL240 (formerly EPIKOTE CURE FL240) by Japan Epoxy Resins Co., Ltd. The amount of curing agent used may be 10-50 parts by weight with respect to 100 parts by weight of the thermosetting epoxy resin component, and curing takes place at 70-200° C. and is completed within about 1-180 minutes.

Finally, the thermosetting silicone resin component used preferably has a viscosity of 0.01-10 Pa·s at least in the range of 0-30° C. Curing takes place at 70-200° C. and is completed within about 1-180 minutes. Thermosetting silicone resin components include addition reaction and condensation reaction types, with addition reaction types being preferred to minimize participation by third components, and the thermosetting silicone resin component used may be SE1821 of the SE series of thermosetting silicone components by Dow Corning Toray Co., Ltd. These have low viscosity and satisfactory workability.

Preferred modes (A)-(D) for using each of these resins will now be described.

(A) Mode of the Invention Using Thermosetting Silicone-based Gel Component as Thermosetting Resin Component.

According to the invention, the thermosetting resin component is preferably a thermosetting siliconebased gel component, and preferably the mean fiber diameter of the carbon fibers is 1-20 μm and the thermal conductivity of the carbon fiber composite sheet is at least 3 W/(m·K).

Satisfactory productivity will also be achieved if the mean fiber diameter is within this range. The mean fiber diameters are more preferably 3-15 μm and even more preferably 5-12 μm.

The mean fiber length of the carbon fibers is preferably in the range of 0.01-1000 mm. If the mean fiber length is within the range specified above, the fiber aggregate will have satisfactory handleability. The mean fiber length is more preferably 0.1-500 mm and even more preferably 3-300 mm.

The hardness of the obtained carbon fiber composite sheet is measured based on the penetration degree according to JIS K6249. The penetration degree is preferably in the range of 30-90. At less than 30, the flexibility will be impaired and the sheet will have a reduced shape following property for complex shapes. If it is greater than 90, on the other hand, the sheet will be very vulnerable to pricking and may not be suitable for practical use.

The thermosetting silicone-based gel preferably has a penetration degree of no greater than 90 after being formed into a carbon fiber composite sheet, and in particular the hardness is preferably no greater than 90 after heat treatment at 200° C. for 4 hours.

The 180 degree adhesive peel force (tack) of the carbon fiber composite sheet can be evaluated as the 180 degree adhesive peel force according to JIS Z0237, and the 180 degree adhesive peel force is preferably 0.05-1.00 N/cm. If the force is lower than 0.05 N/cm the carbon fiber composite sheet will not be able to exhibit sufficient tack, and no bonding force will be present between the heating unit and heat sink. With a strong tack of greater than 1.00 N/cm, on the other hand, the excessive adhesive force will interfere with handling.

(B) Mode of the Invention Using Thermosetting Epoxy Resin Component as Thermosetting Resin Component.

According to the invention, the thermosetting resin component is preferably a thermosetting epoxy resin component, and preferably the mean fiber diameter of the carbon fibers is 5-20 μm and the thermal conductivity of the carbon fiber composite sheet is at least 5 W/(m·K).

Satisfactory productivity will also be achieved if the mean fiber diameter is within this range. The mean fiber diameter is more preferably 3-15 μm and even more preferably 5-12 μm.

The mean fiber length of the carbon fibers is preferably in the range of 0.01-1000 mm. If the mean fiber length is within the range specified above, the fiber aggregate will have satisfactory handleability. The mean fiber length is more preferably 01-500 mm and even more preferably 3-300 mm.

The carbon fiber composite sheet obtained according to the invention preferably has a weight reduction percentage of no greater than 1% after heat treatment at 150° C. for 4 hours. A weight reduction percentage of no greater than 1% after heat treatment at 150° C. for 4 hours will result in fewer volatilizing components upon heating, allowing the sheet to be suitably used in electronic parts.

(C) Mode of the Invention Using Thermosetting Silicone Resin Component as Thermosetting Resin Component (1).

According to the invention, preferably the thermosetting resin component is a thermosetting silicone resin component, the hardness measured with an Asker-C hardness meter is no greater than 70, the proportion of the carbon fiber aggregate in the carbon fiber composite sheet is in the range of 20-50% as the volume fraction (30-70% as weight percentage), and the thermal conductivity of the carbon fiber composite sheet is at least 3 W/(m·K).

If the hardness measured with an Asker-C hardness meter is no greater than 70 it will be possible to obtain sufficient pliability.

When the proportion of the carbon fiber aggregate in the carbon fiber composite sheet is within the range specified above, it will be possible to obtain a carbon fiber composite sheet with both thermal conductivity and moldability during production of the carbon fiber composite sheet. The volume fraction is more preferably 20-40% (30-60% as weight percentage). The thickness of the carbon fiber composite sheet may be freely set according to the intended purpose, but it is preferably 0.2-10 mm for improved molding yield, and to facilitate uniform molding without thickness variation.

The pre-cured viscosity of the thermosetting silicone resin component is preferably 0.01-10 Pa·s. This range will help reduce potential defects when the carbon fiber aggregate is combined with the thermosetting silicone resin component.

The thermosetting silicone resin component is preferably a component that hardens when held at 100° C. for 1 hour. By using a component that hardens under such treatment, it is possible to increase productivity for the carbon fiber composite sheet.

The thermosetting silicone resin component comprises at least a base compound and a curing agent, and preferably it is a component with a post-curing hardness measured with an Asker-C hardness meter of no greater than 70. A resin that when cured alone has an Asker-C hardness of greater than 70 cannot produce a carbon fiber composite sheet with an Asker-C hardness of less than 70. Consequently, it is preferred to use a component that has an Asker-C hardness of no greater than 70 as a resin alone after heating effect. (D) Mode of the invention using thermosetting silicone resin component as thermosetting resin component (2).

According to the invention, preferably the thermosetting resin is a thermosetting silicone resin component, the hardness measured with an Asker-C hardness meter is no greater than 70 for a mixture obtained by mixing the carbon fiber aggregate and thermosetting silicone resin component with an axial horizontal kneader and/or a paddle-type vertical kneader, molding it and curing the thermosetting silicone resin component, and the proportion of the carbon fiber aggregate in the carbon fiber composite sheet is in the range of 15-30% as the volume fraction (25-50% as weight percentage).

Pliability can be obtained if the Asker-C hardness is less than 70, while it is most preferably 20-70 to achieve both flexibility and tear resistance. Most preferably, the hardness measured with an Asker-C hardness meter is 20-50.

The proportion of the carbon fiber aggregate in the carbon fiber composite sheet is preferably within the range of 15-30% as the volume fraction (25-50% as weight percentage), because this range will result in a carbon fiber composite sheet with satisfactory thermal conductivity. It will also prevent the viscosity of the mixture from becoming too high during mixing.

The pre-cured viscosity of the thermosetting silicone resin component is preferably 0.001-10 Pa·s. This range will help reduce potential defects when the carbon fiber aggregate is combined with the thermosetting silicone resin component. The range is more preferably 0.001-2 Pa·s.

The thermosetting silicone resin component is preferably a component that hardens when held at 180° C. for 15 minutes. Such a thermosetting silicone resin component is preferred for production of molded articles with a fast curing speed.

The thermosetting silicone resin component comprises at least a base compound and a curing agent, and preferably it is a component with a post-curing hardness measured with an Asker-C hardness meter of no greater than 70. Pliability can be obtained if the Asker-C hardness is less than 70.

The viscosity of a mixture obtained by mixing the carbon fiber aggregate and thermosetting silicone resin component with an axial horizontal kneader and/or a paddle-type vertical kneader is preferably no greater than 1000 Pa·s at any 30° C. shear rate of between 1 and 10/sec. Such a mixture has a high flow property and therefore has suitable moldability for extrusion molding, cast molding, press molding and the like. More preferably, the viscosity of the mixture is no greater than 500 Pa·s at any 30° C. shear rate of between 1 and 10/sec, and even more preferably no greater than 50 Pa·s at any 30° C. shear rate of between 1 and 10/sec. The viscosity affects all of the handling properties. Since this viscosity will never be lower than the viscosity of the thermosetting silicone resin component, the lower limit will naturally be the viscosity of the thermosetting silicone resin component.

The modes (A)-(D) described above are preferred, but there is no limitation to these.

The carbon fiber composite sheet may be effectively used as a thermal conductive molded article, a radio shielding molded article, a heat exchanger, or the like.

As a preferred mode for production of a carbon fiber composite sheet, according to modes (A)-(C) described above, there may be mentioned a method of molding by impregnating the carbon fiber aggregate with the thermosetting resin component and then performing press molding, injection molding, extrusion molding or cast molding.

For mode (D) described above, the following mode is preferred when producing the carbon fiber composite sheet.

A specific example is a process for production by successive steps including an extrusion step in which a mixture of the carbon fiber aggregate and the thermosetting silicone resin component obtained by mixing with an axial horizontal kneader and/or a paddle-type vertical kneader is extruded onto a continuous carrier film, a film attachment step in which continuous films are attached over the extruded mixture, a compression step in which the mixture sandwiched by the films is passed through at least a pair of rollers with a fixed clearance, and a step of heat treatment of the compressed mixture.

In this process, a mixture with controlled viscosity comprising the carbon fiber aggregate and thermosetting silicone resin component is used as the starting material. An extruder is used for extrusion of the mixture onto the carrier film. In the extrusion step, the mixture may be discharged at a fixed flow rate through a fixed clearance known as the die or lip, but extrusion by natural dropping may be employed instead.

The mixture extruded from the discharge slit is then received and transported by the carrier film. Since the mixture flows out continuously from the discharge slit, the carrier film that receives it must also be continuous. The film may be continuously supplied from an unwinder. A cover film is also attached to the air space side of the extruded mixture. This step is the film attachment step. The mixture sandwiched between carrier films is passed through at least a pair of rollers with a fixed clearance and molded to a consistent thickness. This step is the compression step. Next, the compressed mixture is passed through a heat treatment step to obtain a carbon fiber composite sheet. The heat treatment may involve application of energy corresponding to heat treatment at 180° C. for 15 minutes, for curing of the thermosetting silicone resin component.

The heat treatment may employ an infrared heater, or a hot air drier or the like, and any heat treatment process may be implemented so long as the object of the invention can be exhibited. The carbon fiber composite sheet obtained from the curing step may be continuously wound up into a roll in a wind-up step.

The carrier film used for this purpose is preferably a polymer film with a melting point of at least 180° C., and polyethylene terephthalate films, polyethylene naphthalate films and the like are suitable for use. There are no restrictions on the thickness of the carrier film, and any film may be used that allows the effect of the invention to be obtained without interfering with handleability.

The carbon fiber composite sheet obtained in this manner may be subjected to treatment to provide the surface with a pressure-sensitive adhesive property, or it may be attached to a pressure-sensitive adhesive material or direct heat-generating material for use as a thermal conductive molded article.

The use of the molded article will now be explained in more detail. The molded article may be used as a heat-radiating member or heat transfer member to effectively dissipate heat generated by semiconductor elements or electronic parts such as power sources or light sources in electronic devices and the like, or it may be used as a structural material for the same. It can also closely follow the shapes of such parts that have become ever more complex in recent years. The carbon fiber composite sheet of the invention can be easily cut with scissors or the like. More specifically, it may be worked into any desired shape that can be provided by a shaping die and used between heat-generating members such as semiconductor elements and heat-radiating members such as radiators, or it maybe shaped into a radiator plate, semiconductor package part, heat sink, heat spreader, die pad, printed wiring board, cooling fan part, heat pipe, enclosure or the like for use.

It may be used either in its original flat form, or in a three-dimensional form. Flexible heat pipes can also be formed using it.

Prior to mixing with the thermosetting silicone resin, the carbon fiber aggregate exists as a mat wherein the carbon fibers are intermingled with each other in a three-dimensional fashion inside the aggregate, and the mixing procedure is preferably continued until disappearance of the mat state of the carbon fiber aggregate in the mixture. This will yield a homogeneous mixture and help improve the moldability.

Disappearance of the mat state means that the form of the fiber aggregate is no longer maintained and the carbon fibers are dispersed in the thermosetting silicone resin component, the mixture exhibiting a muddy appearance. Since the carbon fibers have not been cut any further even though they are in this state, the thermal conductivity is adequately maintained. This can be efficiently achieved preferably by finely shredding the carbon fiber aggregate beforehand and mixing it with the thermoplastic silicone resin component. The fine shredding method may involve cutting with a cutter and shredding with air pressure, or tearing by hand. Also, a prescribed amount of carbon fiber aggregate may be added to the liquid silicone resin component and stirring effected with the kneader. In order to accomplish this efficiently, it is preferred to combine the shredding procedure with the kneading procedure.

EXAMPLES

The present invention will now be explained in greater detail by examples, with the understanding that the invention is not in any way restricted by the examples. The values in the examples were determined by the following methods.

(1) The mean fiber diameter of the carbon fibers was determined by measuring the diameters of 60 fired fibers using a scale under an optical microscope, and taking the average value.

(2) The mean fiber length of the carbon fibers was determined by measuring the lengths of 60 fired fibers with a length measuring machine and taking the average value.

(3) The thermal conductivity of the carbon fiber composite sheet was determined by the probe method using a QTM-500 by Kyoto Electronics Co., Ltd.

(4) The crystallite size of the carbon fibers was determined by the "Gakushin" method, measuring the reflection from the (110) plane appearing in X-ray diffraction.

(5) The penetration degree of the carbon fiber composite sheet was determined by the method described in JIS K6249.

(6) The 180 degree adhesive peel force of the carbon fiber composite sheet was determined as the 180 degree adhesive peel force according to JIS Z0237.

(7) The carbon fiber composite sheet was allowed to stand in a hot air drier at 150° C. for 4 hours, the change in weight before and after heat treatment was determined, and the weight reduction percentage was calculated.

(8) The hardnesses of the carbon fiber composite sheet and silicone resin component alone were determined with an Asker-C hardness meter.

(9) The carbon fiber density was determined with a pycnometer.

Comparative Example 1

Pitch comprising a fused polycyclic hydrocarbon compound was used as the starting material. The optical anisotropy percentage was 100% and the softening point was 283° C. Using a cap with a 0.2 mm$\phi$ diameter, heated air was ejected from the slit at a linear speed of 5500 m per minute, dragging the molten pitch to form pitch-based staple fibers with a mean fiber diameter of 14.5 μm. The spun fibers were collected on a belt to form a mat, and a fiber aggregate composed of pitch-based staple fibers with a basis weight of 320 g/m$^2$ was obtained by cross lapping.

The fiber aggregate was heated in air from 170° C. to 285° C. at a mean temperature-elevating rate of 6° C./min, for infusibility treatment. The infusibility treated pitch-based staple fiber aggregate was fired at 2300° C. The mean fiber diameter of the fired carbon fiber aggregate was 9.8 μm, and the ratio of fiber diameter dispersion to mean fiber diameter was 12%. The mean fiber length was 50 mm. The crystallite size in the direction of growth of the hexagonal mesh surface was 17 nm. The carbon fiber aggregate was obtained as a mat wherein the carbon fibers were intermingled in a three-dimensional manner inside the carbon fiber aggregate. The carbon fiber density was 2.0 g/cm$^2$.

A SE1886 by Dow Corning Toray Co., Ltd. was then used as a gel component for coating onto two parting agent-coated metal pieces to a basis weight of 210 g/m$^2$ using a bar coater, and the carbon fiber aggregate was set in a die with an inside measurement of 300 mm, at a basis weight of 270 g/m$^2$, in such a manner that the volume ratio of the molded article of the carbon fiber aggregate was 25% (40% as weight ratio) and the thickness was 0.5 mm. It was then press molded at 150° C. with a vacuum press by Kitagawa Seiki Co., Ltd.

The thermal conductivity of the molded carbon fiber composite sheet was measured to be 6.4 W/(m·K). The penetration degree of the carbon fiber composite sheet was 45. The penetration degree of the carbon fiber composite sheet after heat treatment at 200° C. for 4 hours was 40. The 180 degree adhesive peel force of the carbon fiber composite sheet was 0.25 N/cm.

Comparative Example 2

A carbon fiber aggregate was prepared by the same method as Comparative Example 1. A SE1885 by Dow Corning Toray Co., Ltd. was then used to coat the gel component onto two parting agent-coated metal pieces to a basis weight of 210 g/m$^2$ using a bar coater, and the carbon fiber aggregate was set in a die with an inside measurement of 300 mm, at a basis weight of 270 g/m$^2$, in such a manner that the volume ratio of the molded article of the carbon fiber aggregate was 25%

(40% as weight ratio) and the thickness was 0.5 mm. It was then press molded at 150° C. with a vacuum press by Kitagawa Seiki Co., Ltd.

The thermal conductivity of the molded carbon fiber composite sheet was measured to be 6.4 W/(m·K). The penetration degree of the carbon fiber composite sheet was 75. The penetration degree of the carbon fiber composite sheet after heat treatment at 200° C. for 4 hours was 70. The 180 degree adhesive peel force of the carbon fiber composite sheet was 0.20 N/cm.

Example 1

Pitch comprising a fused polycyclic hydrocarbon compound was used as the starting material. The optical anisotropy percentage was 100% and the softening point was 283° C. Using a cap with a 0.2 mm$\phi$ diameter, heated air was ejected from the slit at a linear speed of 5500 m per minute, dragging the molten pitch to form pitch-based staple fibers with a mean fiber diameter of 14.5 µm. The spun fibers were collected on a belt to form a mat, and a fiber aggregate composed of pitch-based staple fibers with a basis weight of 320 g/m² was obtained by cross lapping.

The fiber aggregate was heated in air from 170° C. to 285° C. at a mean temperature-elevating rate of 6° C./min, for infusibility treatment. The infusibility treated fiber aggregate was fired at 3000° C. The mean fiber diameter of the fired carbon fiber aggregate was 9.6 µm, and the ratio of fiber diameter dispersion to mean fiber diameter was 10%. The mean fiber length was 30 mm. The crystallite size in the direction of growth of the hexagonal mesh surface was 31 nm. The carbon fiber aggregate was obtained as a mat wherein the carbon fibers were intermingled in a three-dimensional manner inside the carbon fiber aggregate. The carbon fiber density was 2.2 g/cm³. 8E1886 by Dow Corning Toray Co., Ltd. was used as the thermosetting siliconebased gel component. The gel was coated onto two parting agent-coated metal pieces to a basis weight of 200 g/m² using a bar coater, and the carbon fiber aggregate was set in a die with an inside measurement of 300 mm, at a basis weight of 280 g/m², in such a manner that the volume ratio of the molded article of the carbon fiber aggregate was 25% (43% as weight ratio) and the thickness was 0.5 mm. It was then press molded at 150° C. with a vacuum press by Kitagawa Seiki Co., Ltd.

The thermal conductivity of the molded carbon fiber composite' sheet was measured to be 9.6 W/(m·K). The penetration degree of the carbon fiber composite sheet was 40. The penetration degree of the carbon fiber composite sheet after heat treatment at 200° C. for 4 hours was 35. The 180 degree adhesive peel force of the carbon fiber composite sheet was 0.30 N/cm.

Example 2

A carbon fiber aggregate was prepared by the same method as Example 1. SE1885 by Dow Corning Toray Co., Ltd. was used as the thermosetting silicone-based gel component. The gel was coated onto two parting agent coated metal pieces to a basis weight of 175 g/m² using a bar coater, and the carbon fiber aggregate was set in a die with an inside measurement of 300 mm, at a basis weight of 280 g/m², in such a manner that the volume ratio of the molded article of the carbon fiber aggregate was 25% (43% as weight ratio) and the thickness was 0.5 mm. It was then press molded at 150° C. with a vacuum press by Kitagawa Seiki Co., Ltd.

The thermal conductivity of the molded carbon fiber composite sheet was measured to be 9.8 W/(m·K). The penetration degree of the carbon fiber composite sheet was 70. The penetration degree of the carbon fiber composite sheet after heat treatment at 200° C. for 4 hours was 65. The 180 degree adhesive peel force of the carbon fiber composite sheet was 0.25 N/cm.

Comparative Example 3

A carbon fiber composite sheet was prepared in the same manner as Comparative Example 1, except that the firing temperature was 1300° C. The volume ratio of the carbon fiber aggregate in the molded article was 25% (38 as weight ratio), and the crystallite size in the direction of growth of the hexagonal mesh surface was 3 nm. The carbon fiber density was 1.8 g/cm³.

The thermal conductivity of the molded carbon fiber composite sheet was measured to be 1.4 W/(m·K). The penetration degree of the carbon fiber composite sheet was 45. The penetration degree of the carbon fiber composite sheet after heat treatment at 200° C. for 4 hours was 40. The 180 degree adhesive peel force of the carbon fiber composite sheet was 0.25 N/cm. The thermal conductivity was not a sufficient value.

Comparative Example 4

The near-field shielding performance of the carbon fiber composite sheet prepared in Comparative Example 1 for electromagnetic waves at 1-3 GHz was measured to be an average of 15 dB.

Comparative Example 5

When a sheet was prepared according to Comparative Example 1 using only a thermosetting silicone-based gel component without the carbon fiber aggregate, measurement of the near-field shielding performance for electromagnetic waves of 1-3 GHz yielded a value of 6 dB lower than Comparative Example 4.

Comparative Example 6

Pitch comprising a fused polycyclic hydrocarbon compound was used as the starting material. The optical anisotropy percentage was 100% and the softening point was 283° C. Using a cap with a 0.2 mm$\phi$ diameter, heated air was ejected from the slit at a linear speed of 5500 m per minute, dragging the molten pitch to form pitch-based staple fibers with a mean fiber diameter of 14.5 µm. The spun fibers were collected on a belt to form a mat, and a fiber aggregate composed of pitch-based staple fibers with a basis weight of 320 g/m² was obtained by cross lapping.

The fiber aggregate was heated in air from 170° C. to 285° C. at a mean temperature-elevating rate of 6° C./min, for infusibility treatment. The infusibility treated fiber aggregate was fired at 2300° C. The mean fiber diameter of the fired carbon fiber aggregate was 9.8 µm, and the ratio of fiber diameter dispersion to mean fiber diameter was 12%. The mean fiber length was 50 mm. The crystallite size in the direction of growth of the hexagonal mesh surface was 17 nm. The carbon fiber aggregate was obtained as a mat wherein the carbon fibers were intermingled in a three-dimensional manner inside the carbon fiber aggregate. The carbon fiber density was 2.0 g/cm³.

After combining 100 wt % of jER 871 (formerly EPIKOTE 871: product of Japan Epoxy Resins Co., Ltd.), as the base compound and 30 parts by weight of jER CURE FL240

(formerly EPICURE FL240: product of Japan Epoxy Resins Co., Ltd.) as the curing agent, the resin was coated onto two parting agent-coated metal pieces to a basis weight of 210 g/m² using a bar coater, and the carbon fiber aggregate was set in a die with an inside measurement of 300 mm, at a basis weight of 270 g/m², in such a manner that the volume ratio of the molded article of the carbon fiber aggregate was 25% (40% as volume) and the thickness was 0.5 mm. It was then press molded at 120° C. with a vacuum press by Kitagawa Seiki Co., Ltd.

The thermal conductivity of the molded carbon fiber composite sheet was measured to be 6.2 W/(m·K). The weight reduction percentage after heat treatment at 150° C. for 4 hours was 0.3%.

Example 3

Pitch comprising a fused polycyclic hydrocarbon compound was used as the starting material. The optical anisotropy percentage was 100% and the softening point was 283° C. Using a cap with a 0.2 mmφ diameter, heated air was ejected from the slit at a linear speed of 5500 m per minute, dragging the molten pitch to form pitch-based staple fibers with a mean fiber diameter of 14.5 μm. The spun fibers were collected on a belt to form a mat, and a fiber aggregate composed of pitch-based staple fibers with a basis weight of 320 g/m² was obtained by cross lapping.

The fiber aggregate was heated in air from 170° C. to 285° C. at a mean temperature-elevating rate of 6° C./min, for infusibility treatment. The infusibility treated fiber aggregate was fired at 3000° C. The mean fiber diameter of the fired carbon fiber aggregate was 9.6 μm, and the ratio of fiber diameter dispersion to mean fiber diameter was 10%. The mean fiber length was 30 mm. The crystallite size in the direction of growth of the hexagonal mesh surface was 31 nm. The carbon fiber aggregate was obtained as a mat wherein the carbon fibers were intermingled in a three-dimensional manner inside the carbon fiber aggregate. The carbon fiber density was 2.2 g/cm³. After combining 100 wt % of jER 871 (formerly EPIKOTE 871: product of Japan Epoxy Resins Co., Ltd.), as the base compound and 30 parts by weight of jER CURE FL240 (formerly EPICURE FL240: product of Japan Epoxy Resins Co., Ltd.) as the curing agent, the resin component was coated onto two parting agent-coated metal pieces to a basis weight of 200 g/m² using a bar coater, and the carbon fiber aggregate was set in a die with an inside measurement of 300 mm, at a basis weight of 280 g/m², in such a manner that the volume ratio of the molded article of the carbon fiber aggregate was 25% (43% as weight ratio) and the thickness was 0.5 mm. It was then press molded at 120° C. with a vacuum press by Kitagawa Seiki Co., Ltd.

The thermal conductivity of the molded carbon fiber composite sheet was measured to be 7.6 W/(m·K). The weight reduction percentage after heat treatment at 150° C. for 4 hours was 0.3%.

Comparative Example 7

A carbon fiber composite sheet was prepared in the same manner as Comparative Example 1, except that the firing temperature in Comparative Example 6 was 1300° C. The volume ratio of the carbon fiber aggregate in the molded article was 25% (38 as weight ratio), and the crystallite size due to growth in the direction of the hexagonal mesh surface was 3 nm. The carbon fiber density was 1.8 g/cm³.

The thermal conductivity of the molded carbon fiber composite sheet was measured to be 1.4 W/(m·K). The weight reduction percentage of the carbon fiber composite sheet after heat treatment at 150° C. for 4 hours was 0.3%. The thermal conductivity was not a sufficient value.

Comparative Example 8

A carbon fiber aggregate was prepared by the same method as Comparative Example 6. SE1740 (product of Dow Corning Toray Co., Ltd.) was used instead of a thermosetting epoxy resin component as the resin for coating onto two parting agent-coated metal pieces to a basis weight of 210 g/m² using a bar coater, and the carbon fiber aggregate was set in a die with an inside measurement of 300 mm, at a basis weight of 270 g/m², in such a manner that the volume ratio of the molded article of the carbon fiber aggregate was 25% (40% as weight ratio) and the thickness was 0.5 mm. It was then press molded at 120° C. with a vacuum press by Kitagawa Seiki Co., Ltd.

The thermal conductivity of the molded carbon fiber composite sheet was measured to be 5.6 W/(m·K). The weight reduction percentage after heat treatment at 150° C. for 4 hours was 2.1%. The weight reduction percentage was large.

Comparative Example 9

A 20 g weight heated to 70° C. was placed on the carbon fiber composite sheet prepared in Comparative Example 6 and heating was carried out for 150 seconds to a carbon fiber composite sheet temperature of about 70° C. The weight was then removed, and upon allowing radiation of heat, the temperature returned to 20° C. by 60 seconds. A high heat-radiating effect was confirmed.

Comparative Example 10

A sheet was prepared according to Comparative Example 6 using only a thermosetting epoxy resin without the carbon fiber aggregate, a 20 g weight heated to 70° C. was placed thereover, and heating was carried out for 150 seconds until the epoxy resin temperature reached about 70° C. The weight was then removed, and upon allowing radiation of heat, the temperature returned to 50° C. by 60 seconds, and therefore poorer heat radiation was exhibited than the carbon fiber composite sheet.

Comparative Example 11

The near-field shielding performance of the carbon fiber composite sheet prepared in Comparative Example 6 for electromagnetic waves at 1-3 GHz was measured to be an average of 15 dB.

Comparative Example 12

When a sheet was prepared according to Comparative Example 6 using only a thermosetting epoxy resin without the carbon fiber aggregate, measurement of the near-field shielding performance for electromagnetic waves of 1-3 GHz yielded a value of 6 dB lower than Comparative Example 11.

Comparative Example 13

Pitch comprising a fused polycyclic hydrocarbon compound was used as the starting material. The optical anisotropy percentage was 100% and the softening point was 286° C. Using a cap with a discharge hole having a 0.2 mmφ diameter, heated air was ejected from a slit provided in the discharge hole at a linear speed of 5500 m per minute, dragging the molten pitch to form pitch-based staple fibers with a mean fiber diameter of 11.5 μm. The spun fibers were collected on a belt to form a mat, and a fiber aggregate composed of pitch-based staple fibers with a basis weight of 290 g/m² was obtained by cross lapping.

The fiber aggregate was heated in air from 170° C. to 285° C. at a mean temperature-elevating rate of 6° C./min, for infusibility treatment. The infusibility-treated fiber aggregate was fired at 2300° C. The mean fiber diameter of the fired carbon fiber aggregate was 8.2 μm, and the ratio of fiber diameter dispersion to mean fiber diameter (CV value) was 14%. The mean fiber length was 110 mm. The crystallite size in the direction of growth of the hexagonal mesh surface was 20 nm. The carbon fiber aggregate was obtained as a mat wherein the carbon fibers were intermingled in a three-dimensional manner inside the carbon fiber aggregate. The carbon fiber density was 2.0 g/cm².

The thermosetting silicone resin component used was SE1740 by Dow Corning Toray Co., Ltd., comprising a base compound and curing agent. The viscosity of the thermosetting silicone resin component was 1.1 Pa·s at least in the range of 0-30° C. The hardness of the thermosetting silicone resin component alone was 11 as measured with an Asker-C hardness meter.

The silicone resin component was coated onto two polytetrafluoroethylene sheets to a basis weight of 180 g/m² using a doctor knife, and the carbon fiber aggregate was set in a die with an inside measurement of 300 mm, at a basis weight of 278 g/m², in such a manner that the volume ratio of the molded article of the carbon fiber aggregate was 30% (46% as weight ratio) and the thickness was 0.5 mm. It was then press molded at 150° C. with a vacuum press by Kitagawa Seiki Co., Ltd.

After holding at 100° C. for 1 hour, the carbon fiber composite sheet was taken out and the hardness was measured with an Asker-C hardness meter to be 45. The thermal conductivity was measured to be 6.5 W/(m·K).

Comparative Example 14

A carbon fiber aggregate was prepared by the same method as Comparative Example 13. The thermosetting silicone resin component used was SE1885 by Dow Corning Toray Co., Ltd., comprising a base compound and curing agent. The viscosity of the thermosetting silicone resin component was 1.1 Pa·s at least in the range of 0-30° C. The hardness of the thermosetting silicone resin component alone was 5 as measured with an Asker-C hardness meter.

The thermosetting silicone resin component was coated onto two release agent-coated stainless steel sheets to a basis weight of 180 g/m² using a doctor knife, and the carbon fiber aggregate was set in a die with an inside measurement of 300 mm, at a basis weight of 278 g/m², in such a manner that the volume ratio of the molded article of the carbon fiber aggregate was 30% (46% as weight ratio) and the thickness was 0.5 mm. It was then press molded at 150° C. with a vacuum press by Kitagawa Seiki Co., Ltd.

After holding at 100° C. for 1 hour, the carbon fiber composite sheet was taken out and the hardness was measured with an Asker-C hardness meter to be 45. The thermal conductivity was measured to be 7.1 W/(m·K).

Comparative Example 15

A carbon fiber aggregate was prepared by the same method as Comparative Example 13. The thermosetting silicone resin component used was SE1886 by Dow Corning Toray Co., Ltd., comprising a base compound and curing agent. The viscosity of the thermosetting silicone resin component was 0.5 Pa·s at least in the range of 0-30° C. The hardness of the thermosetting silicone resin component alone was 3 as measured with an Asker-C hardness meter.

The silicone resin component was coated onto two release agent-coated stainless steel sheets to a basis weight of 180 g/m² using a doctor knife, and the carbon fiber aggregate was set in a die with an inside measurement of 300 mm, at a basis weight of 278 g/m², in such a manner that the volume ratio of the molded article of the carbon fiber aggregate was 30% (46% as weight ratio) and the thickness was 0.5 mm. It was then press molded at 150° C. with a vacuum press by Kitagawa Seiki Co., Ltd.

After holding at 100° C. for 1 hour, the carbon fiber composite sheet was taken out and the hardness was measured with an Asker-C hardness meter to be 41. The thermal conductivity was measured to be 5.7 W/(m·K).

Comparative Example 16

A carbon fiber aggregate was prepared by the same method as Comparative Example 13.

The thermosetting silicone resin component used was 8E1821 by Dow Corning Toray Co., Ltd., comprising a base compound and curing agent. The viscosity of the thermosetting silicone resin component was 0.9 Pa·s at least in the range of 0-30° C. The hardness of the thermosetting silicone resin component alone was 40 as measured with an Asker-C hardness meter.

The elastomer was coated onto two release agent-coated stainless steel sheets to a basis weight of 180 g/m2 using a doctor knife, and the carbon fiber aggregate was set in a die with an inside measurement of 300 mm, at a basis weight of 278 g/m², in such a manner that the volume ratio of the molded article of the carbon fiber aggregate was 30% (46% as weight ratio) and the thickness was 0.5 mm. It was then press molded at 150° C. with a vacuum press by Kitagawa Seiki Co., Ltd.

After holding at 100° C. for 1 hour, the carbon fiber composite sheet was taken out and the hardness was measured with an Asker-C hardness meter to be 63. The thermal conductivity was measured to be 6.1 W/(m·K).

Example 4

Pitch comprising a fused polycyclic hydrocarbon compound was used as the starting material. The optical anisotropy percentage was 100% and the softening point was 283° C. Using a cap with a 0.2 mmφ diameter, heated air was ejected from the slit at a linear speed of 5500 m per minute, dragging the molten pitch to form pitch-based staple fibers with a mean fiber diameter of 14.5 μm. The spun fibers were collected on a belt to form a mat, and a fiber aggregate composed of pitch-based staple fibers with a basis weight of 320 g/m² was obtained by cross lapping.

The fiber aggregate was heated in air from 170° C. to 285° C. at a mean temperature-elevating rate of 6° C./min, for infusibility treatment The infusibility treated fiber aggregate was fired at 3000° C. The mean fiber diameter of the fired carbon fiber aggregate was 9.6 μm, and the ratio of fiber diameter dispersion to mean fiber diameter (CV value) was 11%. The mean fiber length was 60 mm. The crystallite size in the direction of growth of the hexagonal mesh surface was 46 nm. The carbon fiber aggregate was obtained as a mat wherein the carbon fibers were intermingled in a three-dimensional manner inside the carbon fiber aggregate. The carbon fiber density was 2.2 g/cm$^3$.

The thermosetting silicone resin component used was SE1740 by Dow Corning Toray Co., Ltd., comprising a base compound and curing agent. The viscosity of the resin component was 1.1 Pa·s. The hardness of the thermosetting silicone resin component alone was 11 as measured with an Asker-C hardness meter.

The thermosetting silicone resin component was coated onto two release agent-coated metal sheets to a basis weight of 180 g/m$^2$ using a doctor knife, and the carbon fiber aggregate was set in a die with an inside measurement of 300 mm, at a basis weight of 278 g/m$^2$, in such a manner that the volume ratio of the molded article of the carbon fiber aggregate was 30% (49% as weight ratio) and the thickness was 0.5 mm. It was then press molded at 150° C. with a vacuum press by Kitagawa Seiki Co., Ltd.

The molded carbon fiber composite sheet was held at 100° C. for 1 hour, cured and molded, and its thermal conductivity was measured to be 9.4 W/(m·K). The hardness of the carbon fiber composite sheet was measured with an Asker-C hardness meter to be 52.

Example 5

A 20 g weight heated to 70° C. was placed on the carbon fiber composite sheet prepared in Example 4 and held for 150 seconds, until the section of the carbon fiber composite sheet in contact with the weight reached about 70° C. The weight was then removed, and upon allowing radiation of heat, the temperature of the section in contact with the weight returned to 30° C. by 50 seconds. A high heat-radiating effect was therefore confirmed.

Example 6

The near-field shielding performance of the carbon fiber composite sheet prepared in Example 4 for electromagnetic waves at 1-3 GHz was measured to be an average of 18 dB.

Comparative Example 17

When a sheet was prepared according to Example 4 using only a thermosetting silicone resin in a sheet form without the carbon fiber aggregate, measurement of the near-field shielding performance for electromagnetic waves of 1-3 GHz yielded a value of 6 dB, and therefore the near-field shielding performance for 1-3 GHz electromagnetic waves was insufficient.

Comparative Example 18

Pitch comprising a fused polycyclic hydrocarbon compound was used as the starting material. The optical anisotropy percentage was 100% and the softening point was 283° C. Using a cap with a 0.2 mmφ diameter, heated air was ejected from the slit at a linear speed of 5500 m per minute, dragging the molten pitch to form pitch-based staple fibers with a mean fiber diameter of 11.5 μm. The spun fibers were collected on a belt to form a mat, and a fiber aggregate composed of pitch-based staple fibers with a basis weight of 310 g/m$^2$ was obtained by cross lapping.

The fiber aggregate was heated in air from 170° C. to 295° C. at a mean temperature-elevating rate of 6° C./min, for infusibility treatment. The infusibility-treated fiber aggregate was fired at 2300° C. The mean fiber diameter of the carbon fibers composing the fired carbon fiber aggregate was 8.3 μm, and the ratio of fiber diameter dispersion to mean fiber diameter (CV) was 14%. The mean fiber length was 80 mm. The crystallite size in the direction of growth of the hexagonal mesh surface was 15 nm. The carbon fiber aggregate was obtained as a mat wherein the carbon fibers were intermingled in a three-dimensional manner inside the carbon fiber aggregate. The carbon fiber density was 2.0 g/cm$^3$.

The thermosetting silicone resin component used was SE1740 by Dow Corning Toray Co., Ltd., comprising a base compound and curing agent. The viscosity of the thermosetting silicone resin component was 1.1 Pa·s at least in the range of 0-30° C. The hardness of the silicone resin component alone after heat treatment at 180° C. for 15 minutes was 11 as measured with an Asker-C hardness meter.

The carbon fiber aggregate and thermosetting silicone resin component base compound were stirred with a paddle-type vertical kneader, and then a thermosetting silicone resin component curing agent was further added, and the carbon fiber aggregate at 30% as the volume fraction (46% as weight percentage) was dispersed until the mat form disappeared, to prepare a mixture. The viscosity of the mixture was 56 Pa·s, with a shear rate of 1.7/sec at 30° C.

The carrier film used was a 75 μm polyethylene terephthalate film, and the mixture was extruded onto the carrier film with a coater. A 75 μm polyethylene terephthalate film was then attached thereto as a cover film. Next, it was passed through a pair of rollers with a clearance of 1 mm, and then through a pair of rollers with a clearance of 0.5 mm, for a compression step. It was subsequently subjected to heat treatment with a hot air drier at 180° C. for 15 minutes for curing.

The Asker-C hardness of the carbon fiber composite sheet obtained in this manner was 39. The thermal conductivity was 4.6 W/(m·K).

Comparative Example 19

A carbon fiber aggregate was prepared by the same method as Comparative Example 18.

The thermosetting silicone resin component used was SE1885 by Dow Corning Toray Co., Ltd., comprising a base compound and curing agent. The viscosity of the thermosetting silicone resin component was 1 Pa·s at least in the range of 0-30° C. The post-curing hardness of the silicone resin component alone was 8 as measured with an Asker-C hardness meter at 180° C. for 15 minutes.

The carbon fiber aggregate and thermosetting silicone resin component base compound were dispersed and mixed with a paddle-type vertical kneader, and then a thermosetting silicone resin component curing agent was further added and mixed therewith until the mat form disappeared, to obtain a mixture. The viscosity of the mixture was 74 Pa·s, with a shear rate of 1.7/sec at 30° C. A carbon fiber composite sheet was prepared by the same production process as Comparative Example 18.

The Asker-C hardness of the carbon fiber composite sheet obtained in this manner was 40. The thermal conductivity was 3.8 W/(m·K).

Comparative Example 20

A carbon fiber aggregate was prepared by the same method as Comparative Example 18.

The thermosetting silicone resin component used was SE1886 by Dow Corning Toray Co., Ltd., comprising a base compound and curing agent. The viscosity of the thermosetting silicone resin component was 0.5 Pa·s at least in the range of 0-30° C. The hardness of the cured thermosetting silicone resin component alone was 6 as measured with an Asker-C hardness meter at 180° C. for 15 minutes.

The carbon fiber aggregate and thermosetting silicone resin component base compound were dispersed and mixed with a paddle-type vertical kneader, and then a thermosetting silicone resin component curing agent was further mixed therewith until the mat form disappeared, to obtain a mixture. The viscosity of the mixture was 59 Pa·s, with a shear rate of 1.7/sec at 30° C. A carbon fiber composite sheet was prepared by the same production process as Comparative Example 18.

The Asker-C hardness of the carbon fiber composite sheet obtained in this manner was 39. The thermal conductivity was 3.3 W/(m·K).

Comparative Example 21

A carbon fiber aggregate was prepared by the same method as Comparative Example 18.

The thermosetting silicone resin component used was SE1821 by Dow Corning Toray Co., Ltd., comprising a base compound and curing agent. The viscosity of the thermosetting silicone resin component was 0.9 Pa·s at least in the range of 0-30° C. The hardness of the cured silicone resin component alone was 40 as measured with an Asker-C hardness meter at 180° C. for 15 minutes.

The carbon fiber aggregate and thermosetting silicone resin component base compound were dispersed and mixed with a paddle-type vertical kneader, and then a thermosetting silicone resin component curing agent was further mixed therewith until the mat form disappeared, to obtain a mixture. The viscosity of the mixture was 106 Pa·s, with a shear rate of 1.7/sec at 30° C. A carbon fiber composite sheet was prepared by the same production process as Comparative Example 18.

The Asker-C hardness of the carbon fiber composite sheet obtained in this manner was 58. The thermal conductivity was 3.0 W/(m·K).

Example 7

Pitch comprising a fused polycyclic hydrocarbon compound was used as the starting material. The optical anisotropy percentage was 100% and the softening point was 283° C. Using a cap with a 0.2 mmϕ diameter, heated air was ejected from the slit at a linear speed of 5500 m per minute, dragging the molten pitch to form pitch-based staple fibers with a mean fiber diameter of 14.5 μm. The spun fibers were collected on a belt to form a mat, and a fiber aggregate composed of pitch-based staple fibers with a basis weight of 330 g/m² was obtained by cross lapping.

The fiber aggregate was heated in air from 170° C. to 295° C. at a mean temperature-elevating rate of 6° C./min, for infusibility treatment. The infusibility-treated fiber aggregate was fired at 3000° C. The mean fiber diameter of the carbon fibers composing the fired carbon fiber aggregate was 9.6 μm, and the ratio of fiber diameter dispersion to mean fiber diameter (CV) was 11%. The mean fiber length was 60 mm. The crystallite size in the direction of growth of the hexagonal mesh surface was 46 nm. The carbon fiber aggregate was obtained as a mat wherein the carbon fibers were intermingled in a three-dimensional manner inside the carbon fiber aggregate. The carbon fiber density was 2.2 g/cm³.

The thermosetting silicone resin component used was SE1740 by Dow Corning Toray Co., Ltd., comprising a base compound and curing agent. The viscosity of the thermosetting silicone resin component was 1.1 Pa·s at least in the range of 0-30° C. The post-curing hardness of the silicone resin component alone was 11 as measured with an Asker-C hardness meter at 180° C. for 15 minutes.

The carbon fiber aggregate and thermosetting silicone resin component base compound were stirred with a paddle-type vertical kneader, and then a thermosetting silicone resin component curing agent was further added, and the carbon fiber aggregate at 30% as the volume fraction (49% as weight percentage) was dispersed until the mat form disappeared, to prepare a mixture. The viscosity of the mixture was 45 Pa·s, with a shear rate of 1.7/sec at 30° C.

The carrier film used was a 75 μm polyethylene terephthalate film, and the mixture was extruded onto the carrier film with a coater. A 75 μm polyethylene terephthalate film was then attached thereto as a cover film. Next, it was passed through a pair of rollers with a clearance of 1 mm, and then through a pair of rollers with a clearance of 0.5 mm, for a compression step. It was then treated with a hot air drier at 180° C., 15 minutes as heat treatment.

The Asker-C hardness of the carbon fiber composite sheet obtained in this manner was 36. The thermal conductivity was 5.4 W/(m·K).

Comparative Example 22

Carbon fiber aggregate at 10% as the volume fraction (18% as weight percentage) and a thermosetting silicone resin component at 90% as the volume fraction were stirred with a paddle-type vertical kneader as in Comparative Example 18 to prepare a mixture. The viscosity of the mixture was 20 Pa·s, with a shear rate of 1.7/sec at 30° C. The Asker-C hardness of the carbon fiber composite sheet prepared by the same method as Comparative Example 1 was 27. The thermal conductivity was 1.2 W/(m·K).

Comparative Example 23

A carbon fiber aggregate at 45% as the volume fraction (62% as weight percentage) and a thermosetting silicone resin component at 55% as the volume fraction were stirred with a paddle-type vertical kneader, and the procedure of Comparative Example 18 was otherwise followed to prepare a mixture. The viscosity of the mixture was 3000 Pa·s with a shear rate of 1.7/sec at 30° C. and the extrudability was poor, making it impossible to prepare a flat carbon fiber composite sheet.

Comparative Example 24

A 20 g weight heated to 70° C. was placed on the carbon fiber composite sheet prepared in Comparative Example 18 and held for 150 seconds, until the section of the carbon fiber composite sheet in contact with the weight reached about 70° C. The weight was then removed, and upon allowing radiation of heat, the temperature of the section in contact with the weight returned to 37° C. by 50 seconds. A high heat-radiating effect was confirmed.

Comparative Example 25

A sheet was prepared according to Comparative Example 18 using only a thermosetting silicone resin in a sheet form without the carbon fiber aggregate, and a 20 g weight heated to 70° C. was placed thereover and held for 150 seconds until the resin temperature at the section in contact with the weight reached about 70° C. After then removing the weight and allowing radiation of heat, the temperature returned to 55° C.

by 60 seconds, and therefore a poor heat-radiating effect was exhibited compared to the carbon composite sheet used in Comparative Example 18.

Comparative Example 26

The near-field shielding performance of the carbon fiber composite sheet prepared in Comparative Example 18 for electromagnetic waves at 1-3 GHz was measured to be an average of 14 dB.

Comparative Example 27

When a sheet was prepared according to Comparative Example 18 using only a thermosetting silicone resin in a sheet form, without the carbon fiber aggregate, measurement of the near-field shielding performance for electromagnetic waves of 1-3 GHz yielded a value of 6 dB, and therefore the near-field shielding performance for 1-3 GHz electromagnetic waves was insufficient.

What is claimed is:

1. A carbon fiber composite sheet obtained by combining a staple carbon fiber aggregate with a thermosetting resin component selected from the group consisting of thermosetting silicone-based gel components, thermosetting epoxy resin components and thermosetting silicone resin components, and then curing the thermosetting resin component, the carbon fiber composite sheet being obtained by firing at 2500-3500° C. and having crystallite sizes of at least 30 nm in the direction of growth of the hexagonal mesh surface of the carbon fibers composing the carbon fiber aggregate, and the carbon fiber composite sheet having a thermal conductivity of at least 2 W/(m·K),
wherein the carbon fiber aggregate is obtained by being spun by a melt blowing process.

2. A carbon fiber composite sheet according to claim 1, wherein the carbon fiber aggregate is a mat formed by three-dimensional intermingling inside the aggregate of the carbon fibers.

3. A carbon fiber composite sheet according to claim 1, wherein the carbon fiber aggregate is composed of carbon fibers obtained from a mesophase pitch starting material, the mean fiber diameter of the carbon fibers is 5-20 μm and the mean fiber length of the carbon fibers is 0.01-1000 mm.

4. A carbon fiber composite sheet according to claim 1, wherein the proportion of the carbon fiber aggregate in the carbon fiber composite sheet is in the range of 15-50% as the volume fraction (25-70% as weight percentage).

5. A carbon fiber composite sheet according to claim 1, wherein the thermosetting resin component is a thermosetting silicone-based gel component, the mean fiber diameter of the carbon fibers is 1-20 μm and the thermal conductivity of the carbon fiber composite sheet is at least 3 W/(m·K).

6. A carbon fiber composite sheet according to claim 5, wherein the mean fiber length of the carbon fibers is 0.01-1000 mm.

7. A carbon fiber composite sheet according to claim 5, wherein the penetration degree is in the range of 30-90.

8. A carbon fiber composite sheet according to claim 5, wherein the 180 adhesive peel force is 0.05-1.00 N/cm.

9. A carbon fiber composite sheet according to claim 1, wherein the thermosetting resin component is a thermosetting epoxy resin component, the mean fiber diameter of the carbon fibers is 5-20 μm and the thermal conductivity of the carbon fiber composite sheet is at least 5 W/(m·K).

10. A carbon fiber composite sheet according to claim 9, wherein the mean fiber length of the carbon fibers is 0.01-1000 mm.

11. A carbon fiber composite sheet according to claim 9, wherein the weight reduction percentage is no greater than 1% after heat treatment at 150° C. for 4 hours.

12. A carbon fiber composite sheet according to claim 1, wherein the thermosetting resin component is a thermosetting silicone resin component, the hardness measured with an Asker-C hardness meter is no greater than 70, the proportion of the carbon fiber aggregate in the carbon fiber composite sheet is in the range of 20-50% as the volume fraction (30-70% as weight percentage), and the thermal conductivity of the carbon fiber composite sheet is at least 3 W/(m·K).

13. A carbon fiber composite sheet according to claim 12, wherein the viscosity of the thermosetting silicone resin component before curing is 0.01-10 Pa·s at least in the range of 0-30° C.

14. A carbon fiber composite sheet according to claim 12, wherein the thermosetting silicone resin component is a component that cures by being held at 100° C. for 1 hour.

15. A carbon fiber composite sheet according to claim 12, wherein the thermosetting silicone resin component is composed of at least a base compound and a curing agent, and the hardness after curing is no greater than 70 as measured with an Asker-C hardness meter.

16. A carbon fiber composite sheet according to claim 1, wherein the thermosetting resin is a thermosetting silicone resin, the hardness measured with an Asker-C hardness meter is no greater than 70 for a mixture obtained by mixing the carbon fiber aggregate and thermosetting silicone resin component with an axial horizontal kneader and/or a paddle-type vertical kneader, molding it and curing the thermosetting silicone resin component, and the proportion of the carbon fiber aggregate in the carbon fiber composite sheet is in the range of 15-30% as the volume fraction (25-50% as weight percentage).

17. A carbon fiber composite sheet according to claim 16, wherein the viscosity of the thermosetting silicone resin component before curing is 0.001-10 Pa·s at least in the range of 0-30° C.

18. A carbon fiber composite sheet according to claim 16, wherein the thermosetting silicone resin component is a component that cures by being held at 180° C. for 15 minutes.

19. A carbon fiber composite sheet according to claim 16, wherein the thermosetting silicone resin component is composed of at least a base compound and a curing agent, and the hardness after curing is no greater than 70 as measured with an Asker-C hardness meter.

20. A carbon fiber composite sheet according to claim 16, wherein the viscosity of a mixture obtained by mixing the carbon fiber aggregate and thermosetting silicone resin component with an axial horizontal kneader and/or a paddle-type vertical kneader is no greater than 1000 Pa·s at any 30° C. shear rate of between 1 and 10/sec.

21. A thermal conductive molded article employing a carbon fiber composite sheet according to claim 1.

22. A radio shielding molded article employing a carbon fiber composite sheet according to claim 1.

23. A heat exchanger employing a carbon fiber composite sheet according to claim 1.

24. A process for production of a carbon fiber composite sheet according to claim 1, the process being characterized by impregnating the carbon fiber aggregate with the thermosetting resin component and then performing press molding, injection molding, extrusion molding or cast molding.

25. A process for production of a carbon fiber composite sheet according to claim 16, the process comprising successive steps including an extrusion step in which a mixture of the carbon fiber aggregate and the thermosetting silicone resin component obtained by mixing with an axial horizontal kneader and/or a paddle-type vertical kneader is extruded onto a continuous carrier film, a film attachment step in which continuous films are attached over the extruded mixture, a compression step in which the mixture sandwiched by the films is passed through at least a pair of rollers with a fixed clearance, and a step of heat treatment of the compressed mixture.

26. A process for production of a carbon fiber composite sheet according to claim 25, wherein prior to mixing with the thermosetting silicone resin, the carbon fiber aggregate exists as a mat wherein the carbon fibers are intermingled with each other in a three-dimensional fashion inside the aggregate, and the mixing procedure is continued until disappearance of the mat state of the carbon fiber aggregate in the mixture.

* * * * *